Patented Jan. 23, 1934

1,944,161

UNITED STATES PATENT OFFICE 1,944,161

PRODUCTION OF ADDITION PRODUCT OF UNSATURATED HYDROCARBONS

John Philip Baxter, Norton-on-Tees, England, assignor to Imperial Chemical Industries Limited, a corporation of Great Britain No Drawing. Application February 12, 1931, Serial No. 515,414, and in Great Britain February 12, 1930

7 Claims. (Cl. 260—166)

This invention relates to the formation of valuable organic compounds by the addition of hydrogen halides or alkyl halides to unsaturated hydrocarbons. It is known to perform a reaction between ethylene, propylene or acetylene and hydrogen halides with the aid of certain metallic catalysts, and it has also been suggested to employ these catalysts supported on porous adsorbents.

Furthermore it has been claimed that active carbon itself is also a good catalyst for these reactions.

According to my present invention, however, I bring about the addition of hydrogen halide or an alkyl halide to an unsaturated hydrocarbon by employing as catalyst ordinary active carbon which has been further activated by treatment at an elevated temperature with the particular hydrogen halide or alkyl halide which is to be employed as one of the reactants. The reaction is conducted at an elevated temperature, preferably between 100° C. and 300° C. and the activation of the carbon is preferably conducted at temperatures between 200° C. and 600° C.

A further feature of my invention is that if the activity of the catalyst above described diminishes on use, it may be restored to its original activity by another treatment at an elevated temperature with the appropriate reactant.

Example

Ordinary commercial active charcoal was heated to a temperature of 400° C. and a slow stream of hydrogen chloride passed through for ½ hour. The temperature was then reduced to 200° C. and a mixture of equal volumes of hydrogen chloride and acetylene introduced with a contact time of 2 minutes. The exit gases were scrubbed with water to remove acid, dried and cooled in order to condense out the vinyl chloride. 95 per cent. of the acetylene introduced was converted to vinyl chloride with practically 100 per cent. yield on the acetylene used up.

After 24 hours continuous use the activity of the catalyst had fallen to such an extent that the conversion of acetylene was only 75 per cent. The supply of reaction gas mixture was then cut off and hydrogen chloride passed over the spent catalyst at a temperature of 400° C. for a period of 3 hours. On passing the reaction gas mixture over the thus treated catalyst, observing the same conditions as before, the conversion of acetylene was again 95 per cent.

As many apparently widely different embodiments of this invention may be made without departing from the spirit and scope thereof, it is to be understood that I do not limit myself to the specific embodiments thereof except as defined in the appended claims.

I claim:

1. In the catalytic production of an addition compound of an unsaturated hydrocarbon and a member of the class consisting of hydrogen halides and alkyl halides in the presence of active carbon as catalyst, the step of reactivating the partially spent catalyst by temporarily interrupting the flow of the reaction gas mixture and substituting a stream of halide of the character which is to be employed in the reaction, the temperature during this stage being 200°–600° C. and being greater than the reaction temperature.

2. The process of claim 1 characterized in that the halides referred to are chlorides.

3. The process of claim 1 in which the member of the class referred to is hydrogen halide.

4. The process of claim 1 in which the member of the class referred to is hydrogen chloride.

5. In the catalytic production of vinyl chloride from acetylene and hydrogen chloride in the presence of active carbon as catalyst, the step of temporarily interrupting the flow of reaction gas mixture and substituting a stream of hydrogen chloride, the temperature during this stage being 200–600° C.

6. In the catalytic production of an addition compound of an unsaturated hydrocarbon and a member of the class consisting of hydrogen halides and alkyl halides in the presence of active carbon and at a temperature of about 100° to 300° C., the step of reactivating the partially spent catalyst by temporarily interrupting the flow of the reaction gas mixture and substituting a stream of halide of the character which is employed in the reaction, the temperature during this stage being 200° to 600° C.

7. The process of claim 6 characterized in that the catalyst is activated prior to the reaction by passing halide of the character which is employed during the reaction, in contact with the catalyst at a temperature of 200° to 600° C.

JOHN PHILIP BAXTER.